United States Patent [19]
McClary

[11] 3,775,150
[45] Nov. 27, 1973

[54] METHOD OF COATING POLYESTER FILAMENTS AND RESULTANT PRODUCT

[75] Inventor: Edward B. McClary, Charlotte, N.C.

[73] Assignee: Celanese Corporation, New York, N.Y.

[22] Filed: Apr. 20, 1972

[21] Appl. No.: 246,085

Related U.S. Application Data

[63] Continuation of Ser. No. 25,772, April 6, 1970, abandoned.

[52] U.S. Cl. ............... 117/7, 117/45, 117/76 T, 117/80, 117/90, 117/138.8 F, 156/110 A, 156/330, 156/335
[51] Int. Cl. ............................................. B32b 27/36
[58] Field of Search ............. 117/76 T, 80, 138.8 F; 156/110 A, 330, 335

[56] References Cited
UNITED STATES PATENTS

| | | |
|---|---|---|
| 3,190,764 | 6/1965 | Cardina ..................... 156/110 A X |
| 3,247,043 | 4/1966 | Cardina ..................... 156/110 A X |
| 3,307,966 | 3/1967 | Shoaf ........................ 156/110 A X |
| 3,423,230 | 1/1969 | Georges ..................... 156/110 A X |
| 3,436,288 | 4/1969 | Patterson ................... 156/110 A X |

FOREIGN PATENTS OR APPLICATIONS

| | | |
|---|---|---|
| 23,875 | 10/1968 | Japan ............................ 117/76 T |

*Primary Examiner*—Ralph Husack
*Attorney*—Stephen D. Murphy et al.

[57] ABSTRACT

A process for producing an adhesive activated polyester reinforcing element and the product produced thereby, the process comprising disposing an uncured epoxy resin coating on essentially undrawn polyester fialents, drawing said filaments at least 1.2 times their length and then coating with a resorcinol-formaldehyde latex dip wherein the formaldehyde to resorcinol mole ratios are from 1.2:1 to 2:1. The resultant product is found to have improved adhesion for rubber.

11 Claims, 2 Drawing Figures

INVENTOR
EDWARD B. McCLARY

METHOD OF COATING POLYESTER FILAMENTS AND RESULTANT PRODUCT

This is a continuation of application Ser. No. 25,772, filed Apr. 6, 1970, now abandoned.

This invention relates to improving the adhesion of adhesive activated polyester reinforcing elements to a rubbery composition and more specifically, to improving adhesion by means of a novel resorcinol-formaldehyde latex composition suitable for use with adhesive activated polyester reinforcing elements.

The majority of rubber goods articles requiring high tensile strength are reinforced with textile materials. For rubber goods articles such as for instance, pneumatic tires, continuous belts, industrial brake diaphragms, bridge pads and the like, reinforcing textile elements are primarily selected from rayon, nylon and polyester textile elements. While rubber adhesion difficulties for rayon nd nylon have largely been resolved, polyester textile elements generally exhibit poor rubber adhesion. However, in view of the exceptional strength of polyester fibers, polyester has still found wide acceptance as a reinforcing element in rubber goods.

One system for improving the adhesion of polyester reinforcing elements to rubber is by treating the surface of the polyester reinforcing element with a polyepoxide. The epoxide coated polyester reinforcing element is then treated with an aqueous dispersion containing a combination of the resorcinol-formaldehyde precondensate and a vinyl pyridine latex. Polyepoxide coatings which have been found to be particularly suitable for such use are polyepoxide coatings which are applied in the absence of a curing agent. Illustrative of such an epoxy resin coating process is U.S. Pat. No. 3,247,043 which coats fully drawn polyester yarn with epoxy resins in the absence of a curing agent. Illustrative of coating undrawn polyester yarns with epoxy resins in the absence of curing agents is that process set forth in copending commonly assigned U.S. application Ser. No. 878,497, filed Nov. 20, 1969. While these adhesion sensitized polyesters are a vast improvement over untreated yarns, the epoxy coated yarns are quite sensitive to resorcinol-formaldehyde latex dips which are given polyester reinforcing elements prior to adhering these elements to green rubber.

It is therefore an object of this invention to provide a process for treating uncured epoxy resin coated polyethylene terephthalate yarns with an improved resorcinol-formaldehyde latex composition.

It is another object of this invention to provide a process for the preparation of reinforced rubber goods by treating an uncured epoxy resin coated polyethylene terephthalate reinforcing element with an improved resorcinol-formaldehyde latex composition followed by the application of rubber.

It is an additional object of this invention to provide a polyethylene terephthalate yarn which has as a first coating, an uncured epoxy resin, and as a second coating, an improved resorcinol-formaldehyde latex composition.

It is still another object of this invention to provide a reinforced rubber goods article containing as a reinforcing element, a polyethylene terephthalate yarn having as a first coating, an uncured epoxy resin and as a second coating, an improved resorcinol-formaldehyde latex composition.

These and other objects of the invention will become more apparent from the following detailed description.

In accordance with this invention, it has now been discovered that an uncured epoxy resin coated polyester reinforcing element which has been coated in the undrawn or fully drawn state may be rendered more amenable to adhering to green rubber by coating with a resorcinol-formaldehyde latex dip wherein the formaldehyde to resorcinol mole ratios are from 1.2 :1 to 2:1. It is preferred that the polyester reinforcing element be coated in the undrawn state.

The latex component of this invention should not be considered as being limited to any specific type of latex, but rather to include all of those latex compositions commonly employed in the rubber fabricating industry. It is preferred however, that the latex contain at least some vinyl pyridine. A latex which has been found to be especially suitable is the butadiene-vinyl pyridine latex. This well-known type of latex is formed from butadiene monomers and vinyl pyridine monomers usually in about a 70/30 ratio. Because of the expense of the vinyl pyridine, a portion thereof is usually substituted by styrene, i.e., up to about 50 percent, e.g., to produce a 70:15:15 latex mixture. The resorcinol-formaldehyde component of the coating composition is a water-soluble resorcinol-formaldehyde resin, which resin is produced by well-known reaction of resorcinol and formaldehyde under aqueous alkaline conditions. The amount of resorcinol-formaldehyde which may be employed with the resorcinol-formaldehyde latex composition can be varied considerably; that is, from about 10 to 100 parts of the resin solution to 100 parts of the latex on a solid basis or about 10 to 30 percent by weight of the latex dip solution. The starting latex is usually diluted with water prior to the addition of the resorcinol-formaldehyde resin to provide the desired final solids content for the coating bath; that is, about 15 to 40 percent solids. The ratio of resorcinol to formaldehyde in the resorcinol-formaldehyde resin, however, is critical, and must be maintained in the formaldehyde to resorcinol mole ratios of from 1.2:1 to 2:1 and preferably from 1.2:1 to 1.8:1.

The term "undrawn yarn" as employed herein includes any yarn which is less than fully drawn; that is to say, underdrawn yarns are also encompassed by this invention. However, all of the polyester yarns for use in conjunction with this invention must be capable of being hot drawn at least 1.2 times along the length and preferably at least two times along the length subsequent to application of the epoxy resin so as to expose virgin surface. The most preferred polyester substrate for coating with epoxy resin is freshly spun polyester yarn in its as extruded or undrawn condition whereby greater amount of virgin surface are exposed.

The term "polyester" as employed herein is deemed to include any highly polymeric linear ester obtained by heating one or more glycols of the series $HO(CH_2)_nOH$ where $n$ is greater than one but not exceeding 10, with a dicarboxylic and preferably terephthalic acid or an ester forming derivative thereof. The phrase "highly polymeric linear esters" may be defined as polyesters which are capable of molecular orientation as shown by characterisic x-ray patterns, by drawing or rolling. Examples of ester-forming derivatives of terephthalic acid are its aliphatic (including cycloaliphatic) and aryl esters and half-esters, its acid halides and its ammonium and amine salts. Examples of the said glycols are ethylene, trimethylene, tetramethylene, hexamethylene and decamethylene glycols. The preferred polyester for purposes of this invention is polyethylene terephthalate. The improved adhesion obtained according to the teachings of this invention may be obtained with all polyethylene terephthalate polymers regardless of their carboxyl end groups content or diethylene glycol content. The effect of coating an underdrawn yarn is to increase the virgin surface of the substrate and thereby provide the desirable result of the invention.

Any epoxy resin having more than one epoxide group per molecule is suitable for use in conjunction with this invention. More specifically, three classes of epoxy resins have been found to be especially suitable, these resins being aliphatic glycidyl ether, aromatic glycidyl ether and aromatic glycidyl ester. The most preferred class of epoxy resins are those with a weight per epoxide of 200 or less and a molecular weight of less than 500. These ranges are based on requirements of the process and not on the adhesion obtainable. High molecular weight resins are insoluble in water and difficult to emulsify. With high weights per epoxide, high concentrations of resins on yarn would be required to give sufficient epoxide groups on yarn for adhesion. These high on yarn concentrations would be difficult to obtain and would result in build-up resin and finish on the hot rolls or plates of the drawing equipment.

The adhesive primer has been described as an epoxy resin, this being the only component required for improved adhesion. However, in practice, it is usually necessary to apply a yarn lubricant (spin finish) to the spun yarn before drawing, and it is more convenient to apply this lubricant and the epoxy resin simultaneously. This can be achieved by applying the epoxy resin and lubricant as an equeous solution, or if either component is not soluble, as an emulsion in water using for instance, a finish roll for the finish application. If desired, the epoxy resin and lubricant can be applied separately to the spun yarn. Any yarn lubricant suitable for use on the spin draw or spun yarn/draw twist process can be used; that is to say, heat stable lubricants giving low fiber to metal friction. The addition of an emulsifier may be required to form the emulsion; antifoams and bateriastats and antistats may also be added to the spin finish.

The present adhesive primers do not contain a curing agent and the problems associated with the epoxy resin/curing agent primers (polymerization of the primer/spin finish and roll deposition, etc., see above) do not occur with these primers.

As previously mentioned, the polyether and polyester polyepoxide to be used in the process of this invention comprise those compounds possessing a plurality of 1,2-epoxy groups (i.e.,

groups). These polyether or polyester polyepoxides, more detailed description of which appears in U.S. Pat. No. 2,829,071, may be saturated or unsaturated, aliphatic, cycloaliphatic, aromatic or heterocyclic and may be substituted if desired with various substituents, such as halogen atoms, hydroxy groups, ether radicals, and the like. They may also be monomeric or polymeric.

Polyether polyepoxides to be used in the process of the invention may be exemplified by 1,4-bis(2,3-epoxypropoxy)benzene; 1,3-bis(2,3-epoxyporpoxy) benzene; 4,4'-bis(2,3-epoxypropoxy)diphenyl ether; 1,3-bis(2,3-epoxypropoxy)octane; 1,4-bis(2,3-epoxypropoxy)cyclohexane; 4,4'-bis(2-hydroxy-3,4-epoxybutoxy)diphenyldimethylmethane; 1,3-bis(4,5-epoxypentoxy)-5-chlorobenzene; 1,4-bis(3,4-epoxybutoxy)-2-chlorocyclohexane; ethylene glycol diglycidyl ether, resorcinol diglycidyl ether, and 1,2,3,4-tetra-(2-hydroxy-3,4-epoxybutoxy)butane.

Other examples include the glycidyl polyethers of polyhydric phenols obtained by reacting a polyhydric phenol with an excess, e.g., 4 to 8 mole excess of a chlorohydrin, such as epichlorohydrin and dichlorohydrin. Other polyhydric phenols that can be used for this purpose include resorcinol, catechol, hydroquinone, methyl resorcinol, polynuclear phenols, such as 2,2-bis(4-hydroxyphenyl)butane; 4,4'-dihydroxybenzophenone; bis(4-hydroxyphenyl)ethane; and 1,5-dihydronaphthalene.

Still a further group of the polyether polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting produce with an alkaline component. As used herein, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, sorbitol, mannitol, inositol, trimethylolpropane, bis(4-hydroxycyclohexyl) dimethylmethane, 1,4-dimethylolbenzene, 4,4-dimethyloldiphenyl, dimethylol toluenes and the like. The polyhydric ether alcohols include, among others, digylcerol, triglycerol, di-pentaerythritol, tri-pentaerythritol, dimethylolanisoles, beta hydroxyethyl ethers of polyhydric alcohols, such as diethylene glycol, polyethylene glycols;bis (beta hydroxyethyl ether) of hydroquinone; bis(beta hydroxyethyl ether) of bisphenol; beta hydroxyethyl ethers of glycerol, pentaerythritol; sorbitol; mannitol; etc; condensates of alkylene oxides, such as ethylene oxide; propylene oxide; butylene oxide; isobutylene oxide; glycidol; epichlorohydrin; glycidyl ethers, etc. with polyhydric alcohols, such as the foregoing and with polyhydric thioethers, such as 2,2'-dihydroxdiethyl sulfide; 2,2'-3,3'-tetrahydroxy dipropyl pyl sulfide, etc. The hydroxyaldehydes and ketones may be exemplified by dextrose, fructose, maltose, glyceraldehyde. The mercapto (thiol) alcohols may be exemplified by alpha-monothioglycerol, alpha, alpha'-dithioglycerol, etc. The polyhydric alcohol esters may be exemplified by monoglycerides, such as monostearin, monoesters of pentaerythritol and acetic acid, butyric acid, pentanoic acid and the like. The halogenated polyhydric alcohols may be exemplified by the monochloride of pentaerythritol, monochloride of sorbitol, monochloride of mannitol, monochloride of glycerol, and the like.

Other polyether polyepoxides include the polyepoxypolyhydroxy polyethers obtained by reacting, preferably in an alkaline medium, a polyhydric alcohol or polyhydric phenol with a polyepoxide, such as the reaction product of a glycidyl ether of a polyhydric phenol with the same or different polyhydric phenol, the reaction product of glycerol and bis(2,3-epoxypropyl)ether, the reaction product of sorbitol and bis(2,3-epoxy-2-methylpropyl ether, the reaction product of pentaerythritol and 1,2-epoxy-4,5-epoxypentane, and the reaction produce of bis-phenol and bis(2,3-epoxy-2-methylpropyl) ether, the reaction product of resorcinol and bis(2,3-epoxypropyl)ether, and the reaction product of catechol and bis(2,3-epoxypropyl) ether.

A group of polymeric-type polyether polyepoxides comprises the hydroxy-substituted polyepoxide polyethers obtained by reacting preferably, in an alkaline medium, a slight excess, e.g., .5 to 3 mole excess, of a halogen-containing epoxide, such as epichlorohydrin, with any of the aforedescribed poly-hydric phenols, such as resorcinol, catechol, 2,2-bis(4'-hydroxyphenyl) propane, bis ]4-(2'-hydroxynapth-1-yl)-2,2-hydroxynapth-1-yl] methane and the like.

Other polymeric polyether polyepoxides include the polymers and copolymers of the allylic ether of epoxy containing alcohols. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These allylic ethers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), allyl 2,3-epoxypropyl etherstyrene copolymer methallyl 3,4-epoxybutyl ether-allyl, benzoate copolymer poly(vinyl 2,3-epoxypropyl) ether and allyl glycidyl ethervinyl acetate copolymer.

Polyester polyepoxides suitable for use in the process of this invention include polyglycidyl esters of aliphatic and aromatic dicarboxylic acids such as for instance, diglycidylorthophthalate, diglycidylisophthalate, diglycidyladipate, diglycidylazelate and diglycidyl ester of hexahydrophthalic acid.

In carrying out the process of this invention, polyester fibers which have been previously coated with an uncured epoxy resin are then coated with the resorcinol-formaldehyde latex composition of this invention, usually by dipping and squeezing to remove excess bath solution and evenly distributing the resorcinol-formaldehyde latex on the fibers. Although padding or spraying or other techniques known in the art for applying a bath solution to fibers can also be employed for the pick-up of the resorcinol-formaldehyde latex preferably of about 0.5 to 20 percent, e.g., 1 to 10 percent, more preferably about 2 to 5 percent calculated on the weight of the starting fibers.

The thus coated fibers are then dried and the coating cured at about 150° to 250° C., and preferably about 175° to 230° C. for from 30 seconds to 10 minutes, depending on the curing temperature, and preferably about 1 to 4 minutes. A curing temperature close to a softening temperature of the polyester fibers is preferred. An excessively high curing temperature can readily be detected by the fusing of fibers to produce the stiff, relatively inflexible products. If desired, a second coating may be applied, although the solids content of the second coating bath is generally adjusted because the coated fibers do not, as a rule, pick up as much of the resorcinol-formaldehyde latex solution as the uncoated fibers.

A better understanding of the invention may be had from a discussion of the drawings wherein.

Figure 2:
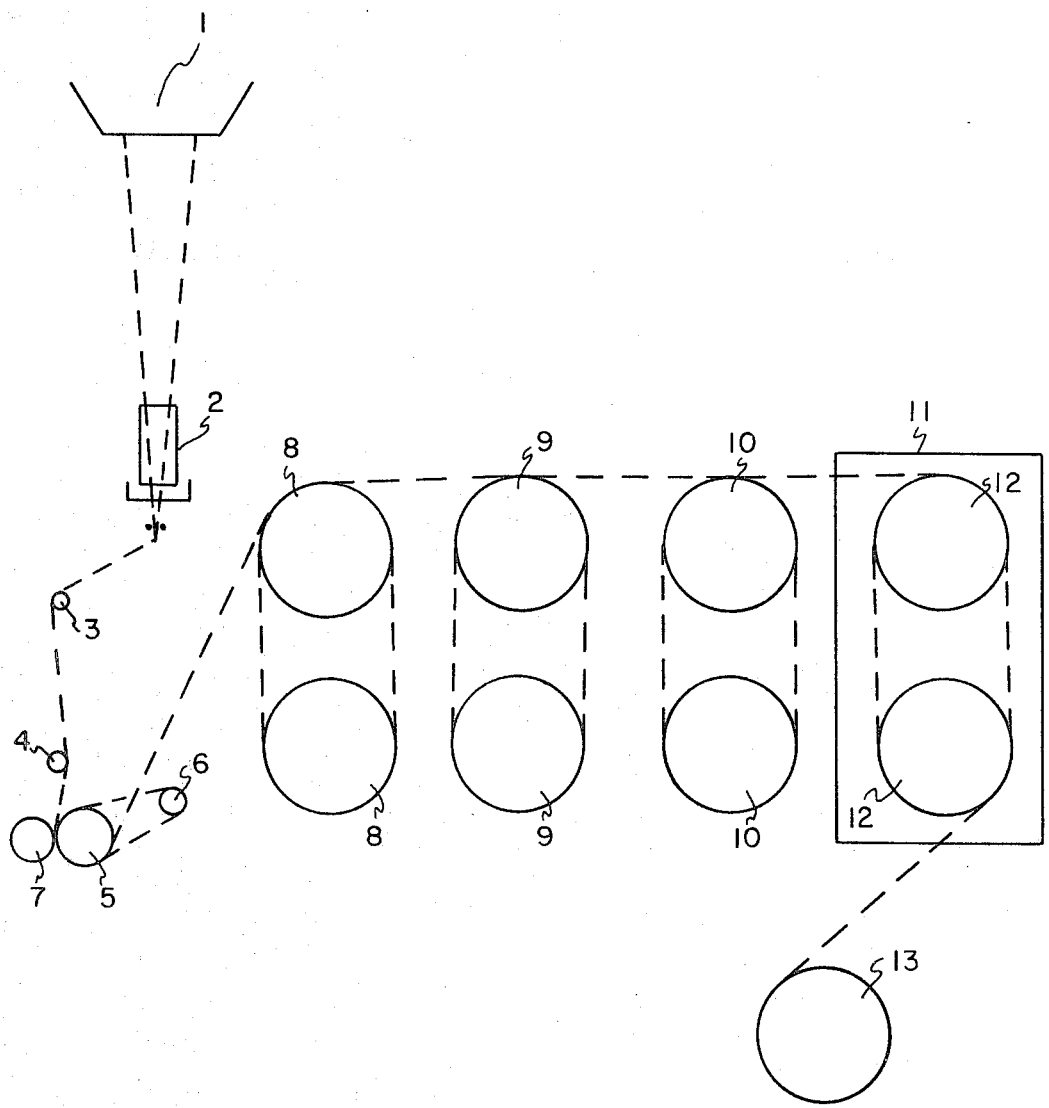
FIG. 2 is a schematic illustration of a spin draw process as employed in conjunction with the adhesive priming process of this invention.

The following specific examples are illustrative of various processes for epoxy resin adhesive priming as employed in the spin draw processes illustrated in FIG. 2 and employing the novel resorcinol-formaldehyde latex dip of this invention. It should be understood, however, that the examples are given for purpose of illustration and that other yarn making processes may be employed, such as for instance, draw twist processes.

EXAMPLE I

1330/192 polyester tire yarn is made using the continuous spin draw process illustrated in FIG. 2. Turning to FIG. 2, it can be seen that a continuous spin draw process is carried out by extruding polyester polymer of suitable melt viscosity into a finish roll and tray assembly 2, the tray containing an uncatalyzed epoxy resin finish. The undrawn yarn is passed over first idler roll 3 and then over second idler roll 4 and then around pre-tensioning rolls 5 and 6 equipped with nip roll member 7. The yarn is then passed around a heated pair of feed rolls 8 and then around a first pair of draw rolls 9. From the first pair of draw rolls, the yarn is passed around a second pair of draw rolls 10 and then into a heated chamber 11 containing a third pair of draw rolls 12, rolls 12 and chamber 11 being maintained at a higher temperature than the first and second pairs of draw rolls. After the final draw, the yarn is taken up on wind-up unit 13. The finish composition placed in the tray of the finish roll and tray assembly 2 is as follows:

0.1 percent sodium carbonate
5 percent glycidyl ether made from epichlorohydrin and glycerine (epoxide equivalent 140–160)
5 percent spin finish containing approximately 60 percent of dimethylpolysiloxanes (average molecular weight 2,000)
5 percent spin finish containing 75 percent ethoxylated sorbitan monooleate (20 moles polyoxyethylene) and 25 percent ethoxylated octophenol (12 moles polyoxyethylene)
85 percent water The resultant yarn is twisted to give a 3 ply 8 × 8 cord and resorcinol-formaldehyde latex dip, the dip being formulated as follows:

331 grams of water
2.6 grams of sodium hydroxide (50 percent aqueous solution)
16.6 grams of resorcinol
14.7 grams of formaldehyde (37 percent aqueous solution)

The above formulation is aged for 1½ hours at 70° to 80° F and the following are added:

195 grams of vinyl pyridine (41 percent solids)

50 grams "Pliolite" (40 percent solids of a styrene butadiene rubber marketed by Goodyear Tire and Rubber Co.)

The entire composition is aged for about 24 hours before being used. After dipping, the cord is heated at 300° F for 130 seconds and 435° F for 70 seconds. The dipped cord was made into a 1 inch peel using commercial pneumatic tire green rubber and rubber cured at 325° F for 15 minutes. These peels gave the following adhesion results:

| 75°F | 250°F |
|---|---|
| 59 lb./in. | 30 lb./in. |

The adhesive strength of the epoxy primer polyester and the epoxy primer resorcinol-formaldehyde latex dip bonds may therefore be considered as at least equal to the cohesive strength of rubber. The visual rating for the sample which has a formaldehyde to resorcinol ratio of 1.2:1 is found to be about 4.4.

EXAMPLE II

The process of Example I is repeated except that the quantity of formaldehyde in the resorcinol-formaldehyde latex composition is 17.2 grams of 37 percent aqueous solution. The peel test is found to give results identical to those of Example I, however, the visual rating improved to about 5.0 in the sample wherein the resorcinol-formaldehyde latex composition had a formaldehyde to resorcinol ratio of 1.4:1.

EXAMPLE III

The process of Example I is repeated except that the quantity of formaldehyde in the resorcinol-formaldehyde latex composition is 24.4 grams of 37 percent aqueous solution. The peel test is found to give results identical to those of Example I, however, the visual rating was about 4 for the sample wherein the resorcinol-formaldehyde latex composition had a formaldehyde to resorcinol ratio of 2.0:1.

EXAMPLE IV

1330/192 polyester produced by the spin draw process illustrated in FIG. 2 is fully drawn and twisted to a cord. A finish is applied to the yarn, the composition of which is a mixture of ethoxylated fatty alcohols, sulphonated peanut oils and ethoxylated fatty acid esters.

An uncatalyzed epoxy resin is then applied to the yarn in a Litzler Computreater (yarn heating apparatus manufacted by C.A. Litzler Co., Cleveland, Ohio).
 0.1 percent sodium carbonate
 10.0 percent glycidyl ether made from epichlorohydrin and glycerine [a triol] (epoxide equivalent 140–160)
 10.0 percent ethoxylated octophenol (12 moles polyoxyethylene)
 80 percent water The epoxy resin coated yarn is heat treated at 300° F for 130 seconds and then given a resorcinol-formaldehyde latex dip having the following composition:
 331 grams of water
 2.6 grams of sodium hydroxide (50 percent aqueous solution)
 17.2 grams of resorcinol
 14.7 grams of formaldehyde (37 percent aqueous solution)

The peel test is found to give results of 28 lb/in. at 250° F and a visual rating of about 4.0 which is, of course, poorer than Example II which employed an identical resorcinol-formaldehyde latex dip to a polyester yarn having uncatalyzed epoxy resin applied while the yarn was in an underdrawn condition.

Figure 1:
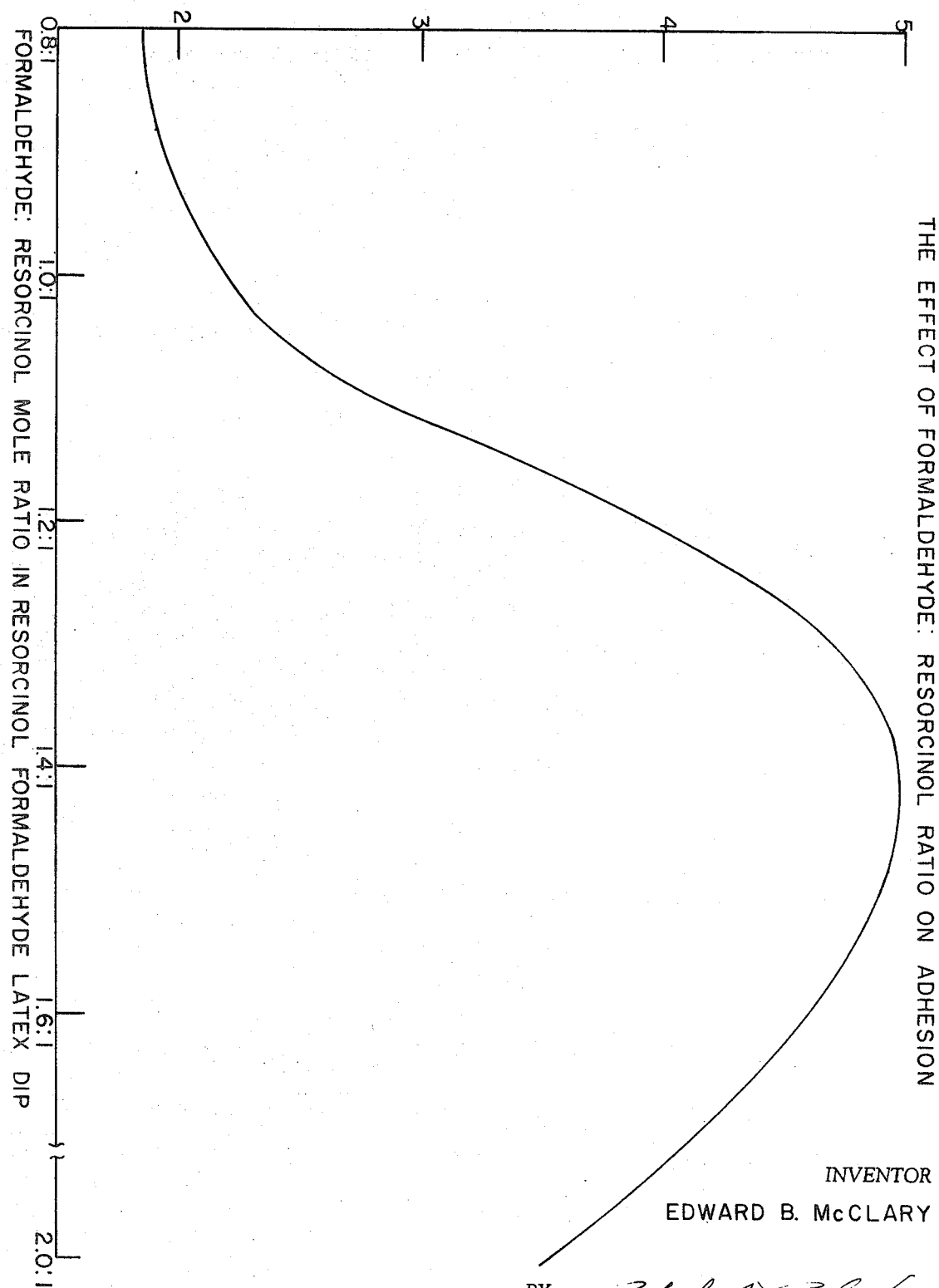
FIG. 1 is a graph plotting adhesion against formaldehyde:resorcinol mole ratio.

Turning to FIG. 1, the pronounced improvement in adhesion obtained when the formaldehyde to resorcinol ratios of the instant invention are maintained may be clearly seen. More specifically, the abbreviated, bell-shaped curve obtained by plotting rubber tear against formaldehyde to resorcinol mole ratio points out in dramatic fashion the improvement obtained in the range of from 1.2:1 to 2.0:1 formaldehyde to resorcinol mole ratio, the most pronounced improvement being obtained at a ratio of 1.4:1 formaldehyde to resorcinol which is representative of Example II.

As previously noted, it is preferred that the epoxy coating be applied to a polyester yarn while in a substantially undrawn configuration, and in the absence of the catalyst. Yarns prepared in this manner are characterized by the polyester element having a high surface energy; that is to say, a surface energy of greater than 45 dynes per cm., a substantially chemically unmodified surface having a discontinuous epoxy coating disposed thereon with a resorcinol-formaldehyde latex coating disposed on the epoxy coating. Another way of expressing the physical nature of the surface of the polyester substrate is that it is a generally porous surface wherein the pores are predominantly less than about 200 in major dimensions. It is preferred that the surface coating be greater than 52 dynes per cm., and that the discontinuous epoxy resin coating disposed thereon be unreacted with the polyester substrate. For purposes of this invention, the phrase "discontinuous coating" is meant to include any uneven coating which tends to produce islands of the applied materials on the substrate.

The term "surface energy" or "critical surface tension" as employed herein may be defined as the surface tension of a liquid which has the lowest surface tension a liquid can have and still exhibit a contact angle greater than zero degrees on the solid. The value of the surface energy is determined by observing the spreading behavior and contact angle, $\odot$, of a series of liquids of decreasing surface tension, $\gamma <$ . A rectilinear relation exists between cosine $\odot$ and $\gamma <$ the intercept of this line with cosine $\odot = 1$ (i.e., $\odot =$ zero) line gives a value of the surface energy which is independent of the nature of the test liquids and is a parameter characteristic of the solid surface only.

It should be understood that surface energy measurements are made upon the polyester substrate which is free of any coating materials. As previously stated, coated polyester substrates are considered to be within the scope of this invention. However, the coating materials must not be chemically reacted with the polyester substrate and must be amenable to being stripped by means of a suitable solvent in order to allow the surface energy test as set forth herein to be conducted on the polyester substrate.

The peel tests which were given in the Examples and as well as the visual ratings set forth in the Examples and the Y axis of the graph of FIG. 1, are obtained using rubber stock known as commercially available green rubber. It should be understood that the improvements obtained by the process of this invention are substantially independent of the composition of the commercially available green rubbers. A representative example of a commercial green rubber is as follows:

| Rubber Master Batch | Parts |
|---|---|
| Styrene Butadiene Rubber | 50 |
| Natural rubber | 50 |
| Carbon black (FEF) | 50 |
| Petroleum oil | 10 |
| Zinc oxide | 5 |
| Stearic acid | 2.5 |
| Total: | 167.5 |

The rubber master batch is then compounded into a final green rubber which is as follows:

| Final Rubber | |
|---|---|
| Rubber master batch | 100 |
| Sulfur | 2.2 |
| Benzothiazole disulfide | 2.0 |

The peel adhesion test mentioned herein is carried out substantially as follows: a layer of green rubber is wrapped around a wind-up drum. This is followed by a layer of cord test sample wound onto the drum, each wind being as closely spaced as possible. Two sections are then cut from the drum and are sandwiched with a sheet of green rubber so that each of the two cord layers are faced with rubber. After curing in a steam heated press, the samples are cut into strips and pulled apart under heat on an Instron tensile tester (precision materials testing instrument manufactured by Instron Corp., Canton, Massachusetts). The average number of pounds to pull the cord layers apart is the measure of the peel resistance of the sample. The procedure for building the peel strip is as follows: place a 1 inch strip of masking tape, tacky side up, over the desired area of a wind-up drum. Cover the wind-up drum with approximately 21 inch lengths of calendered rubber, using a butt joint along the length of the masking tape. Paint the rubber strip with xylene, and lay yarn or cord down on the rubber with each wind being as closely spaced as possible. After a 3 ¼ inch width of fabric has been laid down, it is secured with another small tab of rubber. Pressure is then applied to the fabric by means of the metal roller and the fabric is secured at the splice with another piece of masking tape. The fabric is then cut at the splice and removed from the drum. Samples are then cut into six 3-inch squares. Two pieces of green rubber are then cut into three 3-inch squares. Three pieces of Holland cloth are also cut 3 inches × 1 inch. One 3-inch square of fabric, cords up, is placed on a table top. On top of this rubber laminated fabric, one 3-inch square of green rubber is laid. The 1 inch × 3 inch strip of Holland cloth is placed on the furthermost top of the green rubber aligning the edges. Another 3-inch square of rubber laminated fabric is placed on top of the Holland cloth with the cords of the laminate placed down. After assuring that the cords of the fabric are parallel with each, the sample is ready for curing. The curing is accomplished by preheating a steam heated press to 330° F. An empty peel mold is placed in the press, and steamed for 20 minutes. The sample is then placed in one of the four mold cavities of the peel mold with the remaining three cavities containing dummy samples. The mold with the top in place is held in the press for 15 minutes at 325° F with 4 tons of pressure. After 15 minutes, the mold is removed from the press. The Holland cloth is removed so that cord layers at the sample extremity are exposed. Measurements are made in an Instron machine to determine pounds of pull necessary to delaminate the two cord layers of the sample, the jaws of the Instron machine grasping the exposed ends of the cord layer.

In addition to expressing results as the force required to pull the test specimen apart, a visual rating of the pulled sample is given according to the following scale:

Visual Rating Scale:
5 — complete rubber tear
4 — predominant rubber tear
3 — half rubber tear, half adhesive failure
2 — predominant adhesive failure
1 — complete adhesive failure Having thus disclosed the invention, what is claimed is:

1. The method of treating freshly spun polyester filaments to enhance the adhesion thereof to rubber which comprises the steps of coating the freshly spun essentially undrawn filaments with an uncatalyzed epoxy resin, drawing said coated filaments at least 1.2 times along their length and then coating with a resorcinol-formaldehyde latex composition wherein the formaldehyde to resorcinol mole ratio is from 1.2:1 to 2:1 and subsequently curing the coated product for from 30 seconds to 10 minutes at about 150° to 250°C.

2. The method of claim 1 wherein said polyester is polyethylene terephthalate.

3. The method of claim 1 wherein said latex contains up to about 30 percent vinyl pyridine.

4. The method of claim 1 wherein said epoxy resin is an epoxy resin having more than one epoxide group per molecule.

5. The method of claim 1 wherein the formaldehyde to resorcinol mole ratio is from 1.2:1 to 1.8:1.

6. The coated product produced according to the process of claim 13.

7. The product of claim 6 wherein said polyester is polyethylene terephthalate.

8. The product of claim 6 wherein said latex contains up to about 30 percent vinyl pyridine.

9. The product of claim 6 wherein said epoxy resin is an epoxy resin having more than one epoxide group per molecule.

10. The product of claim 6 wherein the mole ratio of formaldehyde to resorcinol is in the range of from 1.2:1 to 1.8:1.

11. The product of claim 6 wherein said polyester filaments are embedded in rubber.

* * * * *